K. DIENST
GRINDING OF BREAD GRAIN
Oct. 14, 1930.
Re. 17,829
Original Filed Sept. 1, 1928
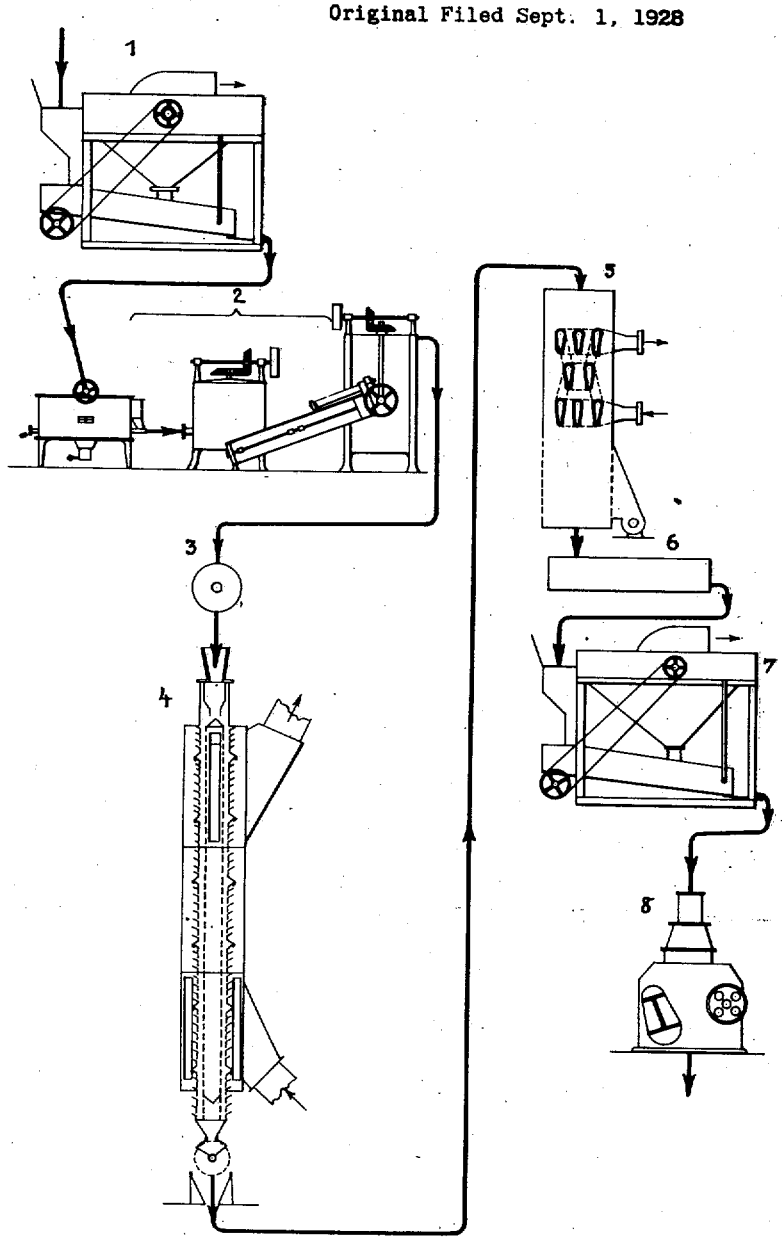
Inventor:
Karl Dienst,
F. W. Dabs,
Atty.

Reissued Oct. 14, 1930 Re. 17,829

UNITED STATES PATENT OFFICE

KARL DIENST, OF FRANKFORT-ON-THE-MAIN, GERMANY

GRINDING OF BREAD GRAIN

Original No. 1,751,032, dated March 18, 1930, Serial No. 303,527, filed September 1, 1928, and in Germany December 24, 1927. Application for reissue filed August 7, 1930. Serial No. 473,694.

This invention has reference to the grinding of bread-grains, wheat, rye, corn and the like, and it is particularly intended to devise means of so conducting the grinding process that the value of the grain as a food is increased and a very high output is secured, and it further relates to means of facilitating the grinding process generally, and to obtain a better product than usually obtainable heretofore. Broadly considered the treatment of grain for the production of flour, as disclosed by the previous art, was usually effected according to two general methods. In accordance with one method previously cleaned grain was submitted to a washing operation and was then substantially completely peeled in the wet condition whereupon it was ground up into flour either directly or after a subsequent drying and additional purification stage. In accordance with another method the previously cleaned and washed but substantially unpeeled grain was caused to pass either without or after repeated wetting or moistening through a plurality of trickling columns or containers of otherwise well-known construction, whereupon the grain was heated up in a well known condition to a temperature of substantially 70 degrees centigrade (158 degrees F.) in a conditioner or similar preparatory treating apparatus and was then cooled down to 20 degrees centigrade (68 degrees F.) and after having passed through the final purification stage was delivered to the grinding instrumentalities.

With the method of treatment first referred to, it was not possible to carry on the preparation of the grains of mixtures of bread grain which usually constitute the material under treatment and which generally consist of grains of soft and hard condition in such a manner that the individual grains became uniform as regards their hardness, and this lack of uniformity in the hardness of the grains interferred very essentially with the process of grinding.

In accordance with the other previous treatment above referred to there is a tendency to arrive at a compensation of the degrees of hardness between the individual grains of respectively soft and hard condition but it has been impossible heretofore to arrive at the desired uniformity, in view of the fact that the layer of woody fibres or cellulose surrounding the grains will absorb and retain the moisture in the wetting and moistening treatment of the grain, without, however, allowing the moisture to reach the core of the grain, because by the passage of the material through the conditioner this moisture is driven off and vaporized. As a result thereof the grains still possess different degrees of hardness and interfere with the grinding in a similar manner as stated with relation to the first-mentioned method. To this should be added the difficulty that the subsequent peeling in the dry way is only able to remove a limited amount of woody fibres, and the remaining fibres constitute a very substantial obstacle to the grinding operation, which increases the consumption of power and reduces the grinding output of white flours and also interferes with the baking qualities thereof.

Now in accordance with my invention which constitutes the subject matter of this application, the previously cleaned or purified and washed grain which has been substantially completely peeled in the wet way, is caused to pass through trickling columns or similar containers of well-known construction and without being previously wetted or moistened, or according to another modification, after having been repeatedly wetted or moistened. Thereupon the grain is heated in a conditioner or similar preparatory instrumentality to a temperature of substantially 70 degrees centrigrade, and is then cooled down to about 20 degrees centigrade, whereupon it is submitted to a subsequent cleaning and to the grinding operation. By being treated in accordance with this method, the complete peeling off of the woody fibre from the grain makes it possible to arrive at a uniform permeation of the core of the grain-flour with the moisture in the wetting and moistening operation of the grains, and the exchange of moisture from one core to the other takes place during the heating stage in which the temperature is increased up to 70 degrees centigrade, and in consequence of the absence of the layer of woody fibres, the permeation of the core with the moisture is effected rapidly and without disturbing influences. In accordance with this method the condition of hardness of the individual grains becomes very uniform for all practical purposes and the grains thus treated may be easily ground with but a low consumption of power and with very high yield into white kinds of flour of superior baking qualities. The grinding in the moist condition is of advantage, because the skin of the grains is sufficiently tough to resist trituration, and it is obvious that triturated particles of the skin and husk would spoil the flour and would make it dark. By sifting off the pure white flour by means of wide-mesh sifters the coarse particles of skin which have not been ground down to a flour-like condition, are thrown off, and a very superior flour of coarse-grained touch which is generally preferred by the public is obtained. Such flour is, moreover, the more adapted for baking purposes the less pressure has been used in the grinding operation, inasmuch as the fats which in the grinding operation of the grain have been forced into the flour considerably reduce the baking qualities thereof. In accordance with the process of this invention, it becomes possible to effect the grinding at a reduced pressure.

The kinds of flour thus obtained show a comparatively high degree of moisture, say about 14 to 17 per cent. For certain purposes of storage and shipping of flour it is, however, desirable to use flours of low degrees of moisture, say of about 12 to 14%. Heretofore it was usual to obtain this low content of moisture by the sharp drying of the grain before grinding, but it was not possible by this means to obtain the desired high yield of pure white flours of high baking qualities, because as a result of the sharp drying procedure, the skin of the grain becomes brittle and is rubbed off and triturated during the ginding, so that the flour obtained in the sifting operation becomes impure and is discolored. Sifters of fine mesh may be used by means of which the finely triturated skin is partly separated from the flour, but the use of such sifters causes the flour to lose its coarse-grained touch which is so much preferred in the trade. Furthermore, in order to be able to separate the flour at all in the case of sifters of fine mesh, it becomes necessary to grind the grain much finer with the resulting increase of pressure between the grinding rollers. Such practice also impairs the baking qualities of the flour. Now, in order to utilize the advantages of the process described, in connection with the manufacture of flour of dry condition, the grain according to this invention instead of being sharply dried before the grinding as heretofore, is treated so as to reduce the excess of moisture in the finished flour obtained by this invention to the desired degree, which may for instance be effected by means of the otherwise well-known drying in vacuo or under reduced air pressure.

On the accompanying drawing a system of apparatus is shown diagrammatically embodying the principal features of my invention, the drawing showing conventionally a combination of pieces of apparatus for the cleaning, peeling and further treating of bread grain. The cleaning section of the plant is indicated at 1 in the drawing, but it is obvious that instead of a single cleaning machine a plurality thereof may be used. From the cleaning section 1 the grain is usually delivered to the washing section of the plant of well-known construction from which it may be conducted, as indicated by the arrows in the drawing, to the usual stone-removing machine 2 which is associated in any approved and convenient manner with the washing section, and in some embodiments with drying devices. The grain is thus washed and while still wet is delivered to the wet-peeling section indicated at 3 in the drawing or to any other kind of peeling instrumentality in which the grain is substantially completely peeled whereupon the grain which, in accordance with the preferred manner of treatment and in accordance with the nature of the particular grain has been wetted one or several times is passed through trickling, airing, drying or similarly treating upright tubes or columns 4 which in the embodiment shown are provided with pervious or perforated walls adapted for the passage of hot air, allowing the moisture to penetrate into the interior of the grain while removing excess of moisture by drying. After having passed through these columns or tubes or through similar drying and airing means of any approved or well-known construction, the grain is conducted into a conditioner indicated at 5 in the drawing and of any suitable construction which in the exemplification shown is provided in its upper portion with heating elements, while in the lower part of the conditioner 5 cooling means (perforated sheets) are arranged. It may thus be heated as hereinbefore mentioned to a temperature of substantially 70 degrees centigrade and cooled down to a temperature of 20 degrees centigrade, for which purpose a further special cooling member 6 may be employed. After having been treated and conditioned in this manner, the grain is submitted to the action of a subsequent cleaning portion of the plant which is diagrammatically indicated at 7 in the drawing, with the understanding, however, that instead of one cleaning section 7, a plurality thereof may be used. From this subsequent cleaning section 7 the treated grain is conducted to one or more series of grinders 8 of any approved construction and from which it may be withdrawn and delivered for consumption or shipment.

It should be understood that the broad features of the invention herein shown and described are susceptible of modifications and changes, as will suggest themselves to the operator in the carrying out of the method described and the operation of the apparatus, except as otherwise stated in the appended claims.

I claim:—

1. The method of grinding bread-grain into flour, which comprises preliminarily cleaning the grain, washing it, then substantially completely peeling the grain in the wet way, submitting it to motion and to airing, thereupon heating it to a temperature of substantially 158 degrees F. and subsequently cooling the heated grain to substantially 68 degrees F. and submitting it to additional cleaning and to a grinding operation.

2. The method of grinding bread-grain into flour, which comprises preliminarily cleaning the grain, washing it, then substantially completely peeling the grain in the wet way, repeatedly moistening it, submitting it to motion and to airing, thereupon heating it to a temperature of substantially 158 degrees F. and subsequently cooling the heated grain to substantially 68 degrees F. and submitting it to additional cleaning and to a grinding operation.

3. The method of grinding bread-grain into flour, which comprises preliminarily cleaning the grain, washing it, then substantially completely peeling the grain in the wet way, repeatedly moistening it, submitting it to motion and to airing, moistening it again, thereupon heating it to a temperature of substantially 158 degrees F. and subsequently cooling the heated grain to substantially 68 degrees F. and submitting it to additional cleaning and to a grinding operation.

4. The method of grinding bread-grain into flour, which comprises preliminarily cleaning the grain, washing it, then substantially completely peeling the grain in the wet way, submitting it to motion and to airing, thereupon heating it to a temperature of substantially 158 degrees F. and subsequently cooling the heated grain to substantially 68 degrees F., submitting it to additional cleaning and to a grinding operation and then drying the finished flour to reduce its moisture.

5. The method of grinding bread-grain into flour, which comprises preliminarily cleaning the grain, washing it, then substantially completely peeling the grain in the wet way, repeatedly moistening it, submitting it to motion and to airing, thereupon heating it to a temperature of substantially 158 degrees F. and subsequently cooling the heated grain to substantially 68 degrees F., submitting it to additional cleaning and to a grinding operation and then drying the finished flour to reduce its moisture.

6. The method of grinding bread-grain into flour, which comprises preliminarily cleaning the grain, washing it, then substantially completely peeling the grain in the wet way, repeatedly moistening it, submitting it to motion and to airing, moistening it again, thereupon heating it to a temperature of substantially 158 degrees F. and subsequently cooling the heated grain to substantially 68 degrees F., submitting it to additional cleaning and to a grinding operation and then drying the finished flour to reduce its moisture.

In testimony whereof I have affixed my signature.

KARL DIENST.